United States Patent
Kimura et al.

[11] 3,900,246
[45] Aug. 19, 1975

[54] LANTHANUM TITANATE SINGLE CRYSTAL ELECTRO-OPTIC MODULATOR

[75] Inventors: Masakazu Kimura; Satoshi Nanamatsu; Kikuo Doi; Shigeo Matsushita, all of Tokyo, Japan

[73] Assignee: Nippon Electric Company Limited, Tokyo, Japan

[22] Filed: Feb. 25, 1974

[21] Appl. No.: 445,349

Related U.S. Application Data

[63] Continuation-in-part of Ser. No. 251,156, May 8, 1972, abandoned.

[30] Foreign Application Priority Data
May 24, 1971   Japan.............................. 46-35763

[52] U.S. Cl. ............................. 350/150; 350/160 R
[51] Int. Cl.² .......................................... G02F 1/26
[58] Field of Search......... 350/150, 160 R; 252/62.9

[56] References Cited
UNITED STATES PATENTS
3,747,022   7/1973   Nanamatsu et al. ......... 350/160 R X

OTHER PUBLICATIONS
Kurtz et al., "A Powder Technique for the Evaluation of Nonlinear Optical Materials," *Journal of Applied Physics*, Vol. 39, No. 8, July 1968, pp. 3798–3813.

*Primary Examiner*—John K. Corbin
*Attorney, Agent, or Firm*—John M. Calimafde

[57] ABSTRACT

An optical modulator is disclosed in which a lanthanum titanate single crystal is employed as the electro-optic material. Intensity, frequency, or phase modulation of either continuous or pulsed laser beams may be achieved by the modulator which may be operated over a broad bandwidth including the visible spectrum at low modulation voltage and power.

2 Claims, 1 Drawing Figure

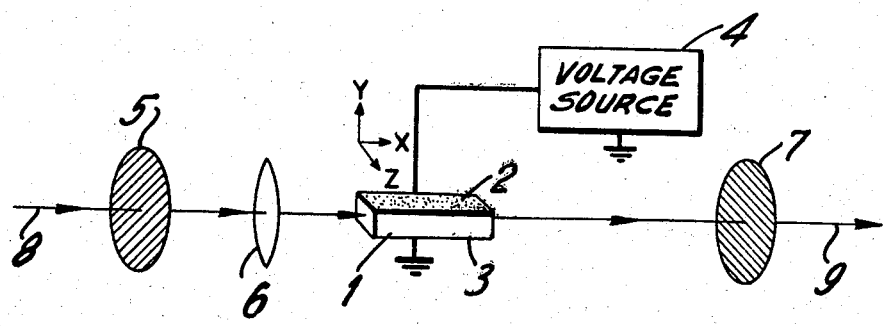

LANTHANUM TITANATE SINGLE CRYSTAL ELECTRO-OPTIC MODULATOR

This application is a continuation-in-part application of the application Ser. No. 251,156, filed on May 8, 1972, now abandoned.

This invention relates generally to intensity modulators for high frequency electromagnetic waves including those in the visible spectrum, and more particularly to a modulator for coherent light beams of the type operating on the linear electro-optic effect.

The operation of electro-optic modulators is based upon the characteristics of a single crystal material in which a property for the transmission of electromagnetic waves is changed by the application of an electric field to the material. The transmitted electromagnetic wave that may be modulated in an electro-optic modulator may be continuous or pulsed, and may result in a variation in the intensity, frequency, or phase of the wave.

The use of potassium dihydrogen phosphate (KDP) in electro-optic modulators is known. This crystal is, however, inadequate for practical usage because of its deliquescence and brittleness, the latter characteristic resulting in difficulties in cutting and polishing of the KDP crystal.

Lithium niobate ($LiNbO_3$) single crystal has recently been found as a physically and chemically stable material for use in light modulators. This crystal can be readily grown in a crystal size suitable for modulators by a Czochralski method, and can also be readily cut and polished. The electro-optic effect of this crystal is greater than that of KDP. However, this crystal has a serious drawback as a result of so-called radiation damage; that is, irradiation of the electromagnetic wave causes a change in the refractive index of the irradiated part of the crystal.

Lithium tantalate ($LiTaO_3$) has also been found to be a suitable material for use as an electro-optic modulator. This crystal material shows no evidence of radiation damage and has all of the excellent physical and chemical stability and electro-optic activity of lithium niobate. However, lithium tantalate is still inadequate for use in broad-band, highly sensitive modulators.

In addition to these materials mentioned above, $Gd_2(M_0O_4)_3$, $Bi_{12}G_eO_{20}$, $Bi_4(G_eO_4)_3$ and $BaTiO_3$ are indicated as electro-optic materials in U.S. Pat. No. 3,164,754 and in Journal of Applied Physics, vol. 39, No. 8, 1968, P. 3798. However, the electro-optic effects of $Gd_2(M_0O_4)_3$, $Bi_{12}G_eO_{20}$ and $Bi_4(G_eO_4)_3$ crystals are far worse than that of KDP, $LiNbO_3$ or $LiTaO_3$. As for $BaTiO_3$, it is difficult to obtain a homogeneous crystal in large size. Therefore, these materials are also inadequate for use in highly sensitive modulators.

It is an object of the invention to provide a novel electro-optic material for use in an optical modulator that has none of the aforesaid disadvantages of the heretofore known and employed electro-optic crystal materials.

In accordance with the invention, single crystals of the approximate nominal composition of $La_2Ti_2O_7$, lanthanum titanate, have been found to exhibit an improved electro-optic effect over that of lithium tantalate. Like lithium tantalate, lanthanum titanate manifests no radiation damage when it is irradiated by electromagnetic waves over long periods, has excellent physical and chemical stability, can be readily cut and polished, and can be grown in large crystal size by conventional techniques such as the Czochralski method and floating zone technique to yield uniform single crystal of high quality.

Electro-optic modulators utilizing lanthanum titanate single crystals may be operated either continuously or pulsed, and can be employed to produce either intensity, frequency, or phase variations in the electromagnetic wave with broad bandwidths. A particular advantage of the invention resides in that the optical modulator employing the lanthanum titanate crystal operates with high efficiency at a sufficiently low modulating voltage, so that the modulating circuit may be transistorized and the overall modulator may be miniaturized.

To the accomplishment of the above and to such further objects as may hereinafter appear, the present invention relates to a lanthanum titanate electro-optic modulator substantially as defined in the appended claims and as described in the following specification taken together with the accompanying drawing, in which the single FIGURE is a schematic view of an optical modulator employing a lanthanum titanate single crystal according to an embodiment of the invention.

Preparation of $La_2Ti_2O_7$ Single Crystal

The starting materials for preparing the lanthanum titanate, $La_2Ti_2O_7$, single crystal are preferably lanthanum oxide ($La_2O_3$) and titanium oxide ($TiO_2$). Other materials may be used which decompose into lanthanum or titanium oxide at elevated temperatures during preparation. The starting materials are weighed so that the molecular ratio of lanthanum oxide to titanium oxide is 1:2, admixed and sintered, for example, at a temperature of 1,400°C, to yield a $La_2Ti_2O_7$ polycrystalline material by solid reaction.

The melting point of $La_2Ti_2O_7$ has been found to be about 1,800°C. According to the crystal growth by the Czochralski method, the sintered material is filled into an iridium crucible, made molten and pulled at a rate of e.g. 6 mm per hour. The single crystal thus obtained is about 10 mm. in diameter and 10 mm in length. In the floating zone technique, a ceramic rod is initially formed from the sintered material. An example of the preparation of the lanthanum titanate crystal by the floating zone technique is as follows. The ceramic rod and a seed crystal are placed in an image furnace as disclosed in IEEE TRANSACTIONS ON MAGNETICS, Vol. MAG-5, No. 3, September 1969, p. 286, FIG. 1, rotated in opposite directions to each other at 30 RPM, and then moved downward in air with a zone speed of 10 mm per hour. The size of the colorless, transparent crystal thus obtained was about 6 mm in diameter and 50 mm in length, its density as measured was 5.8 gram per $cm^3$.

The lanthanum titanate single crystal can be prepared even if the molecular ratio of $La_2O_3$ to $TiO_2$ varies from the stoichiometric composition (1:2) within a range of 0.9:2 to 1.1:2.

General Properties of $La_2Ti_2O_7$ Single Crystal

1. $La_2Ti_2O_7$ single crystal is a biaxial crystal with one of its optic elasticity axes normal to its natural cleavage plane. For convenience, the axes of the $La_2Ti_2O_7$ single crystal are defined in this specification as follows:

Z-axis: optic elasticity axis normal to the natural cleavage plane;

Y-axis: optic elasticity axis contained in the natural cleavage plane and also contained in a plane containing the two optic axes;

X-axis: optic elasticity axis normal to both of the Z- and Y-axes.

2. $La_2Ti_2O_7$ single crystal manifests an excellent linear electro-optic effect. The effect is largest when voltage is applied along the Y-axis and light is propagated along the X-axis. In this case, the half-wave field-distance product is approximately 2.1 kilovolts at 6,328 angstrom units. In detail, the half-wave field-distance product $[E.l]$ $\lambda/2$ was measured under the conditions where a He-Ne laser beam of a wave length of 6,328 angstroms propagates through a single crystal of $La_2Ti_2O_7$ having the size of 1.09 mm (X-axis direction) × 1.22 mm (Y-axis) × 1.62 mm (Z-axis). The values obtained were 2.1 kilovolts when a DC electric field was applied along the Y-axis and a laser beam was propagated along the X-axis, 2.9 kilovolts for the electric field along the Y-axis and the laser beam along the Z-axis, 22 kilovolts for the electric field along the X-axis and laser light along the Y-axis, 19 kilovolts for the electric field along the X-axis and light along the Z-axis, 48 kilovolts for the electric field along the Z-axis and light along the X-axis, and 49 kilovolts for the electric field along the Z-axis and light along the Y-axis.

The best value of the lanthanum titanate single crystal, 2.1 kilovolts, is less than that of the previously known KDP crystal (4.0 kilovolts), $LiNbO_3$ crystal (3.0 kilovolts), $LiTaO_3$ crystal (2.7 kilovolts), $Gd_2(M_oO_4)_3$ crystal (22.3 kilovolts), $Bi_{12}G_eO_{20}$ crystal (5.66 kilovolts) or $Bi_4(G_eO_4)_3$ crystal (27 kilovolts).

3. The lanthanum titanate single crystal is chemically and physically stable and shows no measurable deteriorative effect upon exposure to any normally encountered atmosphere. Its hardness is in the same order as that of $LiNbO_3$. The single crystal can be readily cut and polished.

4. Moreover, $La_2Ti_2O_7$ single crystal is thermally stable. Thermal stability of the optical bias is given by the following formula.

$$l^{-1} \delta |(N_y - N_z) \cdot l| / \delta T \qquad (a)$$

$N_y$ and $N_z$ represent refractive indices, $l$ denotes the length of the X-axis direction of the crystal and $T$ stands for temperature. A single crystal having a small value of the formula $(a)$ manifests stable electro-optical effect against temperature variation. The value of the formula $(a)$ of $La_2Ti_2O_7$ at $\lambda = 6,328$ A ($\lambda$: wavelength) is $1.2 \times 10^{-5}/°C$, which is approximately a quater of the $LiTaO_3$ value of $4.7 \times 10^{-5}/°C$. This fact shows that the $La_2Ti_2O_7$ crystal is very stable against temperature variation.

5. The single lanthanum titanate crystal shows no radiation damage. After the crystal was irradiated by an argon laser light having a power density of 200 kilowatts per $cm^2$ for 2 hours, there was no evidence of radiation damage in the crystal.

6. The relative dielectric constants of the single crystal in the directions of the X-, Y- and Z-axes measured at 1 KHz at room temperature are 52, 62 and 42, respectively. The value of the lanthanum titanate dielectric constant is small and is comparable to that of KDP (50), and $LiTaO_3$ (47).

7. The $La_2Ti_2O_7$ is transparent to visible and near-infrared light and hence it can be employed as an electro-optic modulator for the ordinary laser (He-Ne, argon, etc.) light.

Refractive indices of the crystal are: $N_x = 2.304$, $N_y = 2.326$, $N_z = 2.228$.

8. The lanthanum titanate single crystal has a large piezoelectric activity; the electromechanical coupling coefficient in the longitudinal mode is 30 percent, which is larger than that of $LiTaO_3$ single crystal (21 percent).

9. The lanthanum titanate single crystal doped with 1 atom % of $Nd^{3+}$ shows a strong spectrum of light emission at 1.069 $\mu$ and is an excellent material for a laser.

It will be understood from items (1) to (7) that lanthanum titanate single crystal is the best material for use in electro-optic modulators that has ever been developed and proposed. The figure of merit $1/(\epsilon[E.l]\lambda/2^2)$ of lanthanum titanate is 1.2 times that of lithium tantalate.

It is noted that lanthanum titanate in a ceramic form has been reported in Journal of the American Ceramic Society, vol. 45, No. 9, (1962), p. 416, in Journal of Research of the National Bureau of Standards, vol. 56, No. 1, (1956), p. 17, and in Journal of Applied Physics, vol. 39, No. 8, (1968), p. 3798, but the only parameters of this material that were measured were its dielectric constant, $\tan\delta$ and second harmonic generation intensity for the ceramic sample. The melting point of $La_2Ti_2O_7$ is so high about 1,800°C that the single crystal of $La_2Ti_2O_7$ was not heretofore provided by conventional techniques. Therefore, it was not disclosed in any publication that the single crystal, not powdery form, of $La_2Ti_2O_7$ was prepared and had properties necessary for an electro-optic modulator. It was found for the first time by the present invention that a lanthanum titanate single crystal can be produced and is a suitable material for use as an electro-optic modulator.

EXAMPLE

Referring to the drawing, an electro-optic modulator embodying the invention utilizes a rectilinear body 1 of a lanthanum titanate single crystal having the dimensions 8.4 mm (X-axis direction) by 0.2 mm (Y-axis direction) by 0.2 mm (Z-axis direction). A pair of electrodes 2 and 3 are attached to the two surfaces of the crystal 1 normal to the Y-axis, across which a modulating electric field is applied from a voltage source 4. Crystal 1 is placed between a pair of crossed polarizers 5 and 7 having their polarization directions oriented at +45°, respectively, with respect to the Y-axis of crystal 1. A light beam 8, such as one produced by a He-Ne laser (not shown), is polarized by the polarizer 5, focused on crystal 1 by a lens 6, propagated through crystal 1 along the X-axis thereof, and subjected to modulation by the electric field applied along the Y-axis, that is, in the direction normal to its propagating direction. The light beam 9 modulated in crystal 1 by the electric field applied thereto is let out through polarizer 7.

In the modulator herein specifically shown, the half wave voltage, which is the voltage necessary to achieve 100 percent modulation of the laser beam, may be as low as 50 volts and the capacitance of crystal 1 is as low as 4.7 picofarads. Moreover, the extinction ratio, which is the ratio of minimum transmitted light intensity to maximum transmitted light intensity, is only 1.0 percent. Therefore, the voltage source 4 can be realized by a conventional miniaturized transistor circuit.

The invention has been described with reference to a preferred embodiment. Variations may be included within the scope of the claims. For example, while the directions of the light beam and electric field are shown perpendicular to one another, they may also be parallel to each other. Furthermore, frequency or phase modulation of the light beam is possible, although the invention is herein shown as performing intensity modulation. While reference is made to the nominal composition $La_2Ti_2O_7$, the electro-optic effect is also observed over a compositional range within which the molecular ratio of $La_2O_3$ to $TiO_2$ varies from 0.9:2 to 1.1:2. Small amounts of additives may be tolerated. All such variations are to be included within the terminology "nominal composition."

The present invention is based on the discovery of the excellent electro-optical and related properties of a single crystal of $La_2Ti_2O_7$. Materials for light modulators can be generally evaluated in terms of such factors as the ease with which they can be prepared, excellent electro-optical effect, low dielectric constant, no possibility of radiation damage, and physical and chemical durability. A single crystal of lanthanum titanate is an excellent material for light modulators which meets all of these requirements. By using this material for a modulator element, an excellent light modulator can be constructed. A single crystal of lanthanum titanate can be employed to advantage not only in a light modulator, but in a nonlinear optical element as well.

Thus, while the invention has been herein specifically described with respect to a preferred embodiment, it will be readily apparent that modifications and variations may be made therein, all without departing from the spirit and scope of the invention.

What is claimed is:

1. An intensity modulator for a light beam comprising:
   a. a crystal element having a rectangular parallelepiped shape elongated in the direction parallel to the natural cleavage plane and normal to both of the optic axes of said crystal element, said crystal element comprising a single crystal having a nominal composition of $La_2Ti_2O_7$;
   b. first and second light polarizers having polarization directions at right angles,
   c. means for impressing an electric field across said crystal element in a direction parallel to said natural cleavage plane and parallel to a plane containing both of said optic axes of said crystal element; wherein a light beam is transmitted through said first polarizer, said crystal element and said second polarizer in succession in said direction parallel to said natural cleavage plane and normal to both of said optic axes of said crystal element, and the intensity of said light beam is modified by the linear electro-optic effect of said crystal element.

2. The modulator as claimed in claim 1, in which the molecular ratio of $La_2O_3$ to $TiO_2$ in said crystal element varies from 0.9:2 to 1.1:2.

* * * * *